United States Patent
Chen

(10) Patent No.: US 6,783,351 B2
(45) Date of Patent: Aug. 31, 2004

(54) APPARATUS FOR MANUFACTURING SLIDE FASTENER SPIRAL CONTINUOUS ELEMENT ROW

(76) Inventor: Hung An Chen, 4FL. No. 27, Lane 160, Hsing-Sheng, S. Road, Sec. 1, Taipei 100 (TW)

( * ) Notice: Subject to any disclaimer, the term of this patent is extended or adjusted under 35 U.S.C. 154(b) by 232 days.

(21) Appl. No.: 10/188,101

(22) Filed: Jul. 3, 2002

(65) Prior Publication Data

US 2004/0005376 A1 Jan. 8, 2004

(51) Int. Cl.[7] ............................................... B29C 53/32

(52) U.S. Cl. ........................ 425/193; 425/321; 425/814; 425/DIG. 7; 425/391; 29/410

(58) Field of Search .................................. 425/319, 321, 425/DIG. 7, 126.1, 127, 193, 129.1, 545, 294, 814, 391, 393; 29/408–410

(56) References Cited

U.S. PATENT DOCUMENTS

| | | | | |
|---|---|---|---|---|
| 3,688,805 A | * | 9/1972 | Moertel | 425/814 |
| 3,729,800 A | * | 5/1973 | Popovitsch | 425/814 |
| 4,325,184 A | * | 4/1982 | Omori | 425/391 |
| 4,501,547 A | * | 2/1985 | Mizuhara et al. | 425/391 |
| 4,599,065 A | * | 7/1986 | Takahashi | 425/394 |
| 4,743,412 A | * | 5/1988 | Kuse | 425/814 |
| 5,698,239 A | * | 12/1997 | Tsai et al. | 425/384 |
| 6,302,676 B1 | | 10/2001 | Kato et al. | 425/335 |

* cited by examiner

Primary Examiner—Robert Davis
Assistant Examiner—Thu Khanh T. Nguyen
(74) Attorney, Agent, or Firm—Troxell Law Office PLLC

(57) ABSTRACT

An apparatus for manufacturing slide fastener spiral continuous element row comprises a forming screw assembly, a die assembly, an abutment assembly, and a rear forming assembly. The invention can effect a stable operation with the cooperation of a spring-biased shaft mechanism, a rear adjustment screw, and two side adjustment screws so as to manufacture quality products.

10 Claims, 6 Drawing Sheets

APPARATUS FOR MANUFACTURING SLIDE FASTENER SPIRAL CONTINUOUS ELEMENT ROW

BACKGROUND OF THE INVENTION

1. Field of the Invention

The present invention relates to a manufacturing apparatus for slide fastener (e.g., zipper) continuous element row and more particularly to an improved apparatus for manufacturing slide fastener spiral continuous element row.

2. Description of Related Art

A coupling head forming portion of a conventional apparatus for manufacturing slide fastener continuous element row is disclosed in U.S. Pat. No. 6,302,676, as shown in FIG. 8. The apparatus comprises a pair of screws 1, a die 2, a coupling head forming disc 3, a mandrel 4 between the die 2 and the forming disc 3, a core thread 5 received in a longitudinal recess of the mandrel 4, and an element 6 received in a space defined by the die 2 and the coupling head forming disc 3, the element 6 having a joint portion 6a and an coupling head 6b formed by the coupling head forming disc 3.

Typically, a diameter of the screw 1 is limited to a predetermined maximum value. This is because as the diameter of the screw 1 increases an insertion space of the die 2 decreases due to a change of curvature. That is, two necks 2a of the die 2 are required to conform with diameters of the screws 1. Otherwise, there is a possibility of interference between the neck 2a and the screw 1 at either side of the coupling head forming disc 3. Typically, the diameter of the screw 1 is at a range between 5 mm and 8 mm such as in the case of zipper numbered 3 to numbered 7. In a special case, the diameter of the screw 1 has a maximum value of 10 mm such as in the case of zipper numbered 9 and numbered 10.

However, the prior art suffered from several disadvantages. For example, the diameter of the screw 1 cannot exceed the maximum value. As such, a diameter of a shaft 3a of the coupling head forming disc 3 also cannot exceed a predetermined maximum value. As shown, the diameter of the shaft 3a is about one fifth of that of the screw 1. Otherwise, there is a possibility of interference between the shaft 3a and the screw 1 at either side of the coupling head forming disc 3. Typically, the diameter of the shaft 3a is about 2 mm. Hence, the coupling head forming disc 3 may vibrate strongly due to a high forming pressure and rotation of the coupling head forming disc 3 in the manufacturing process of the element 6. In brief, a strength of the shaft 3a is not sufficient. Further, a size of the die 2 is limited because the screw 1 is received in the die 2. As such, the screw 1, the die 2, and the coupling head forming disc 3 are also limited in size. In other words, allowable increases of the coupling head forming disc 3 and the shaft 3a are also limited. As a result, it is difficult to totally eliminate the vibration. Furthermore, a space available to the necks 2a as provided by the screws 1 is relatively small even if all of the screw 1, the die 2, and coupling head forming disc 3 increase in size. In such case, the necks 2a may become sharp (i.e., smaller cross-sections) for conforming with the diameters of the screws 1. This can reduce a contact area in the manufacturing process of the element 6. In response, the joint portion 6a of the element 6 may recess (i.e., deformed). As a result, it is difficult to totally eliminate the vibration since the strength of the shaft 3a is not sufficient and the limitation of sizes of the screw 1, the die 2, and the coupling head forming disc 3. Moreover, a precision of the element 6 may be adversely affected because a size of the mandrel 4 is small and the mandrel 4 tends to wear (i.e., size changed) or the size of the mandrel 4 exceeds an allowance due to machining error. At this time, an appropriate adjustment of locations of the necks 2a, the mandrel 4, and the coupling head forming disc 3 is required. However, such adjustment is very difficult because the necks 22 are integral part of the die 2 and the coupling head forming disc 3 rotates about the shaft 3a.

Thus, it is desirable to provide an apparatus for manufacturing slide fastener spiral continuous element row in order to overcome the above drawbacks of the prior art.

SUMMARY OF THE INVENTION

It is an object of the present invention to provide an apparatus for manufacturing slide fastener spiral continuous element row wherein a rear forming assembly is secured to a rear abutment plate and a forming screw assembly can effect a stable, very little vibration operation with the cooperation of a main spring, a shaft mechanism and a rear adjustment screw. Thus, high quality products are manufactured.

In one aspect of the present invention, a fine adjustment is made in rear of an abutment assembly so that the adjustment is made easy and simple.

In another aspect of the present invention, a fine adjustment of the forming screw assembly may be done in any time so as to provide an optimal zipper forming space. Also, a mandrel can be corrected if a precision thereof is adversely affected due to wear.

In still another aspect of the present invention, once a size of the mandrel exceeds an allowance due to machining error it is still possible of being corrected by a fine adjustment of the forming screw assembly. Thus, the optimal zipper forming space still can be obtained and a desired precision of the element still can be maintained.

In still another aspect of the present invention, a lateral fine adjustment of the forming screw assembly can be made in any time so as to obtain a more precise positioning of the forming screw assembly for increasing the precision of the element.

The above and other objects, features and advantages of the present invention will become apparent from the following detailed description taken with the accompanying drawings.

DETAILED DESCRIPTION OF THE PREFERRED EMBODIMENTS

Figure 1:
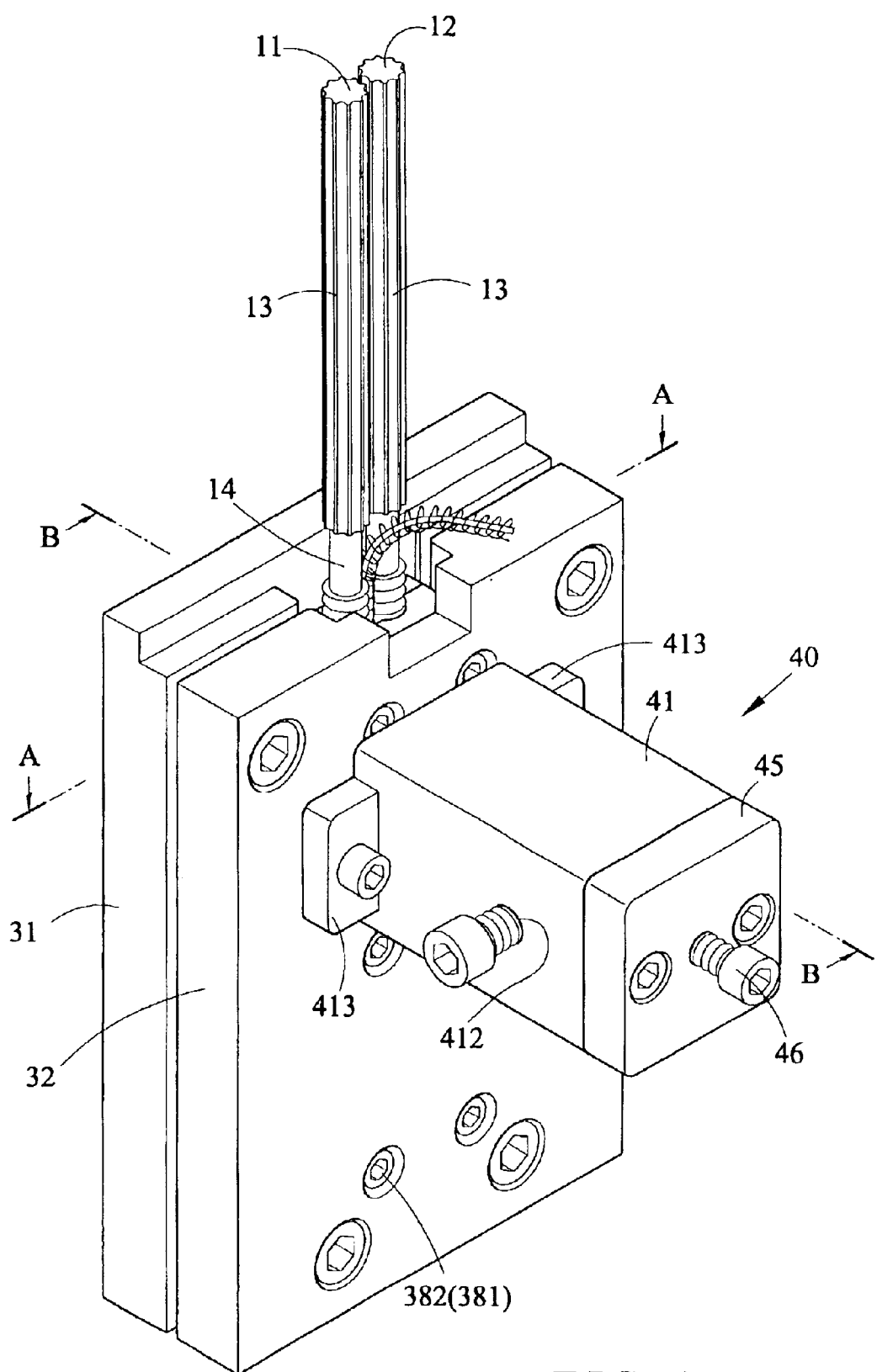
FIG. 1 is a perspective view of a preferred embodiment of an apparatus for manufacturing slide fastener spiral continuous element row according to the invention.
Figure 2:
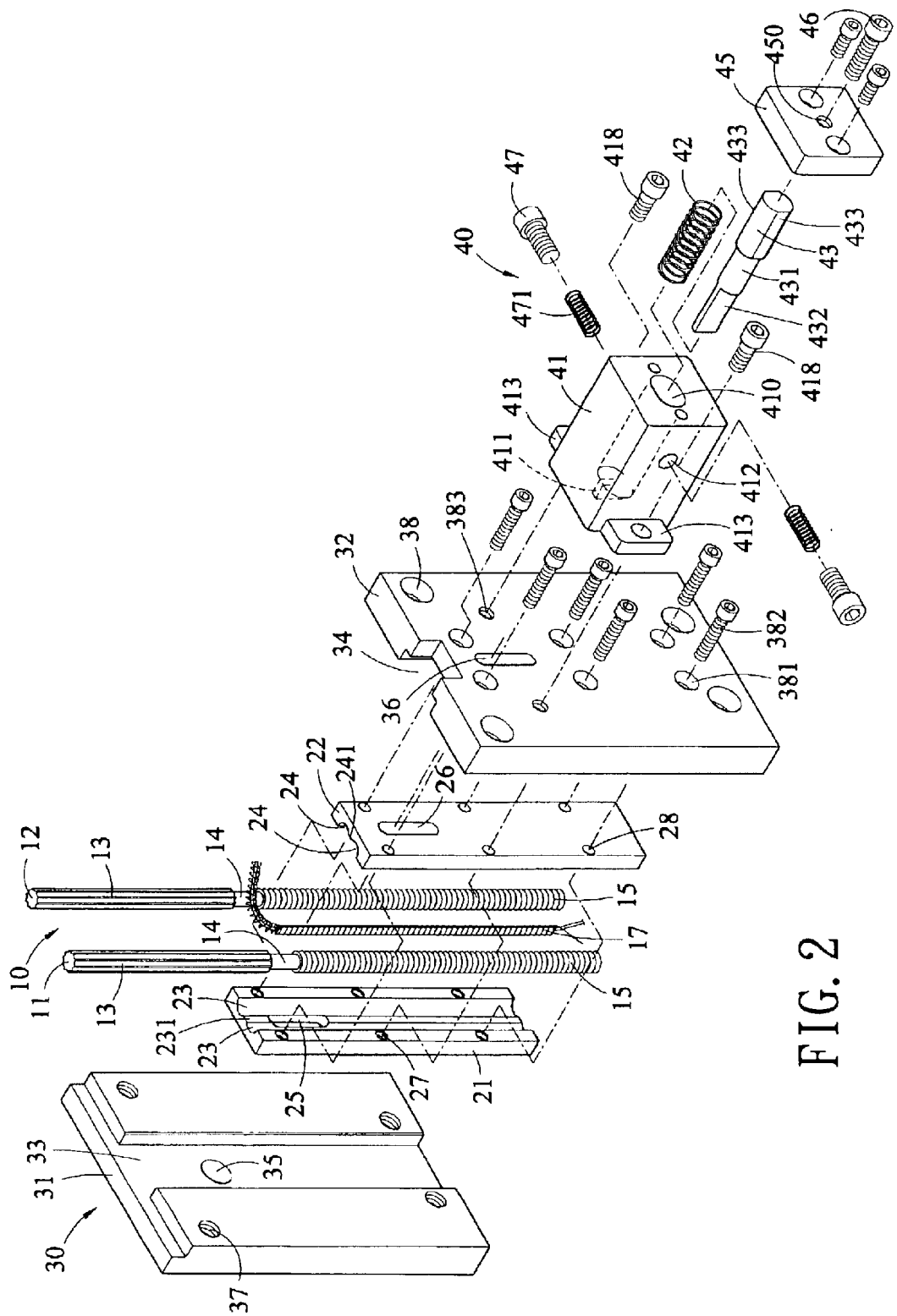
FIG. 2 is an exploded perspective view of FIG. 1.
Figure 3:
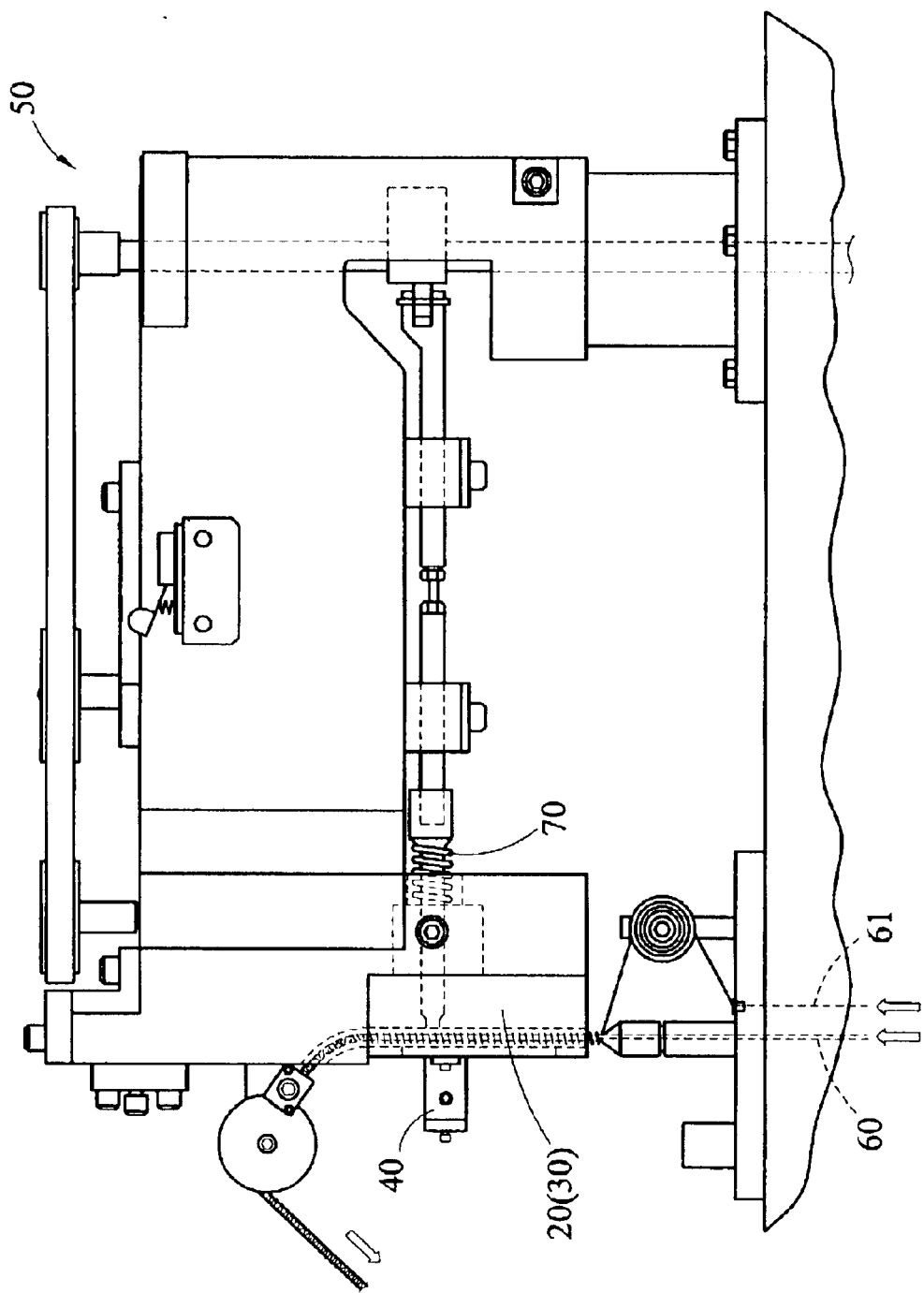
FIG. 3 is a side view showing the apparatus mounted on a zipper machine.
Figure 4:
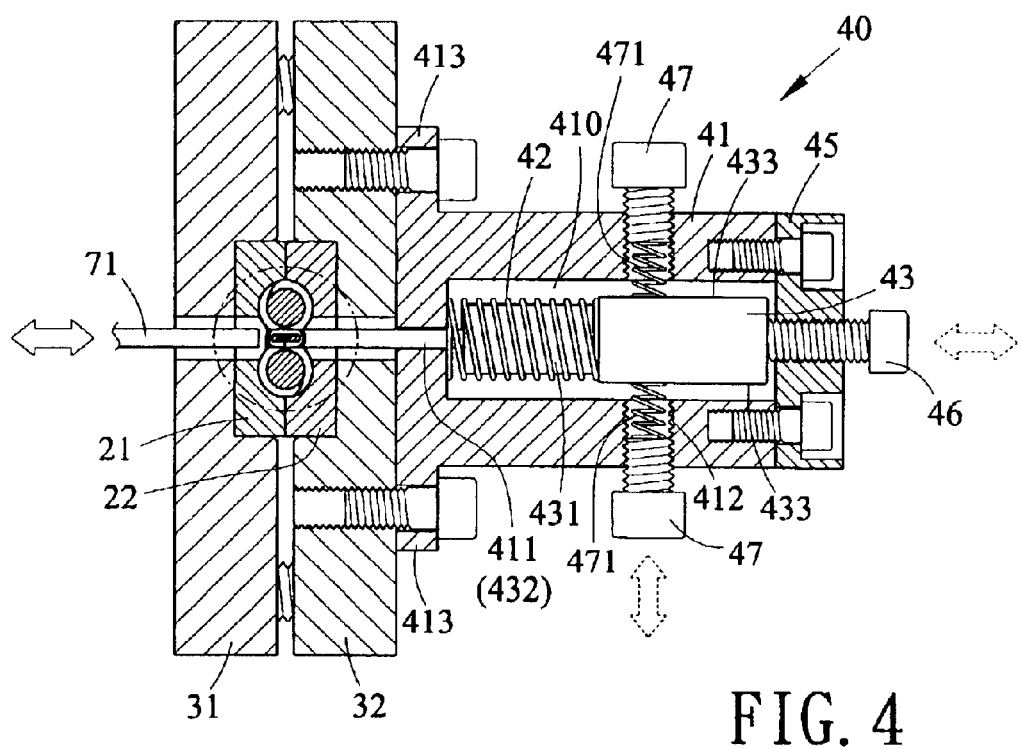
FIG. 4 is a cross-sectional view taken along line A—A of FIG. 1.
Figure 5:
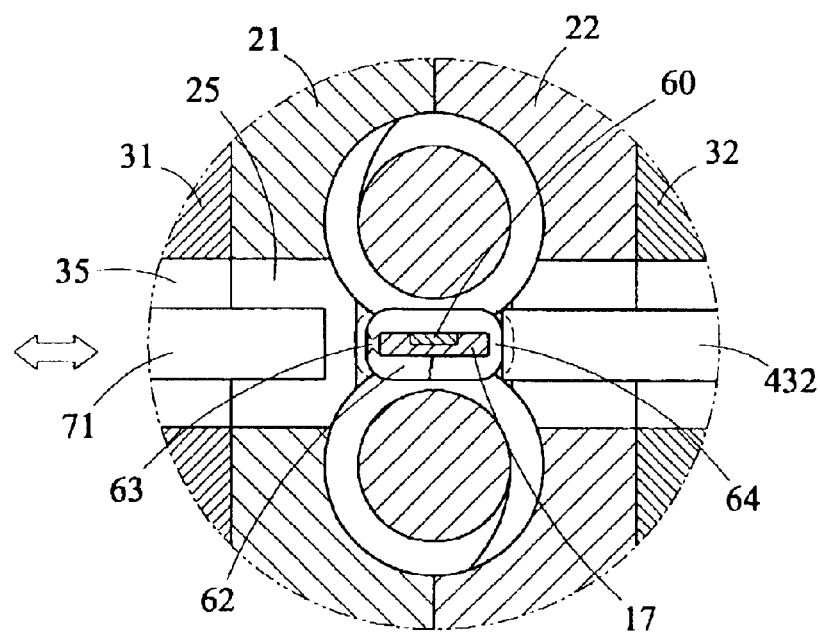
FIG. 5 is a greatly enlarged fragmentary view of the circle shown in FIG. 4.
Figure 6:
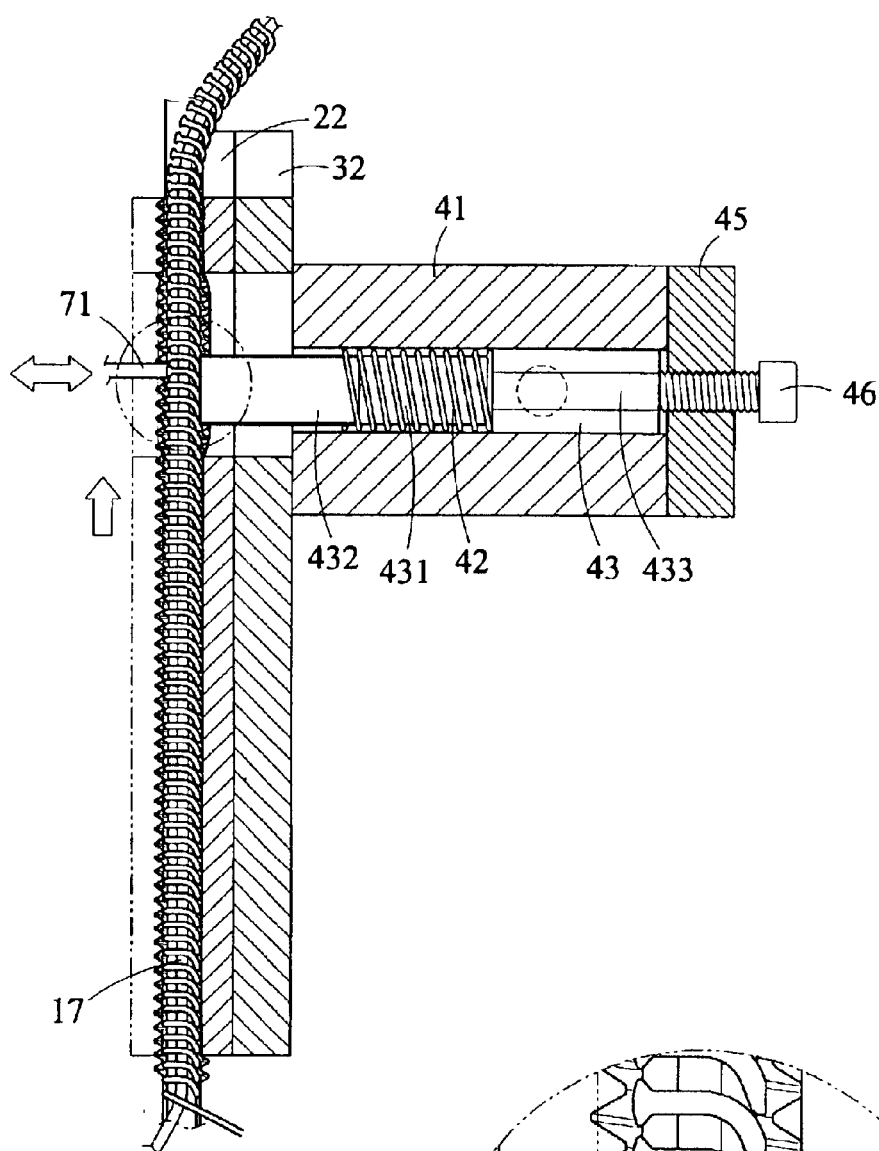
FIG. 6 is a cross-sectional view taken along line B—B of FIG. 1.
Figure 7:
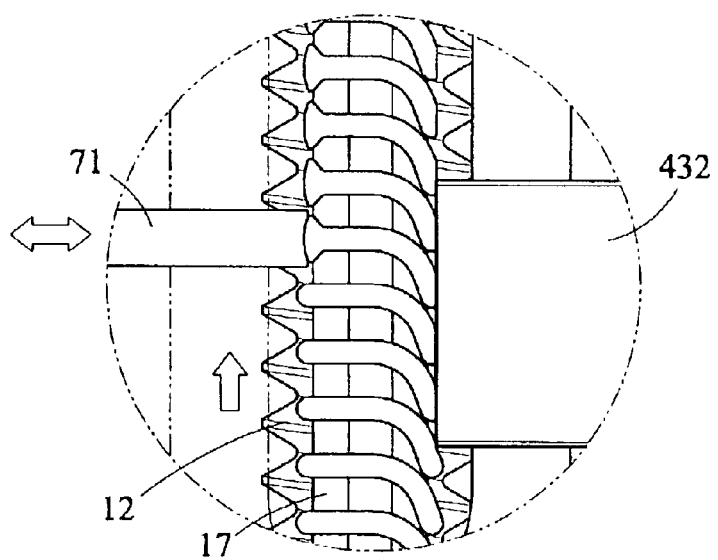
FIG. 7 is a greatly enlarged fragmentary view of the circle shown in FIG. 6.
Figure 8:
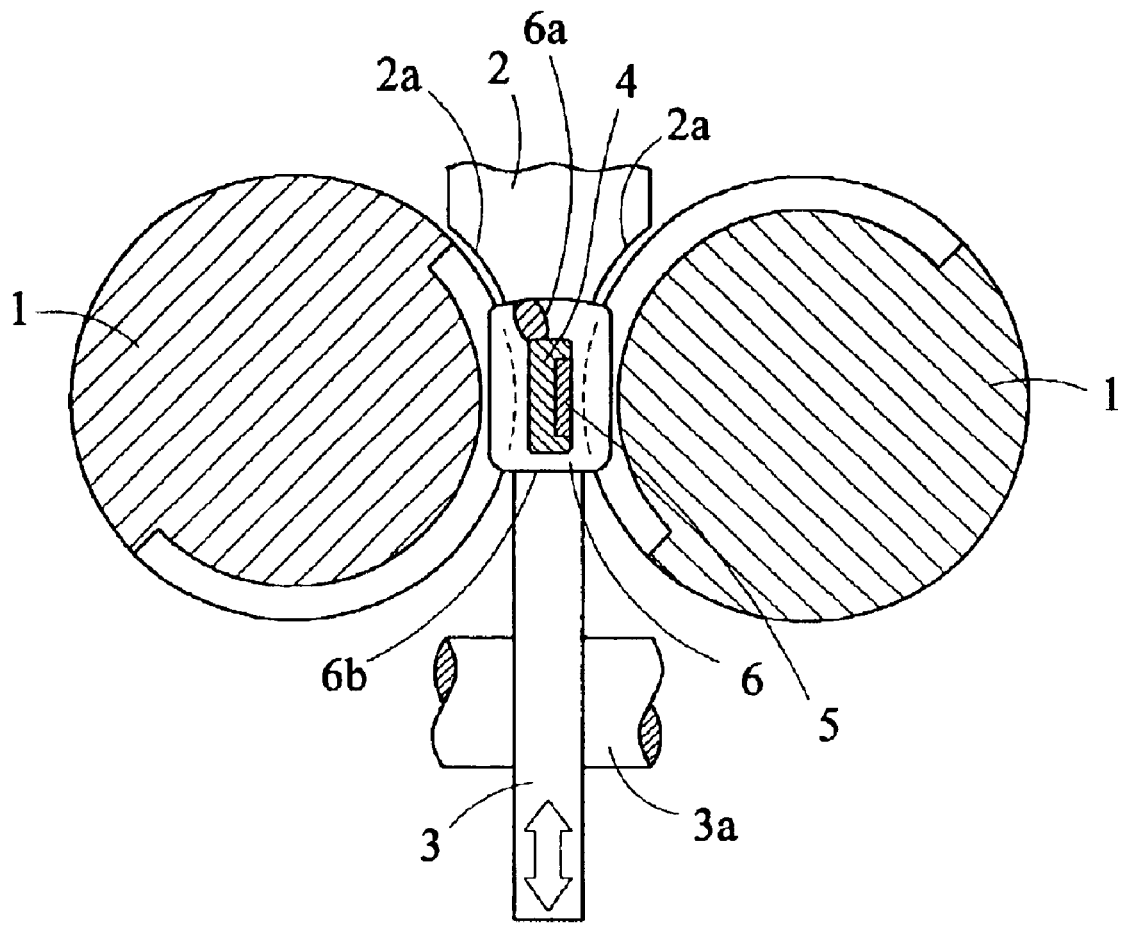
FIG. 8 is a cross-sectional view showing a layout of members of a coupling head forming portion of a conventional apparatus for manufacturing slide fastener spiral continuous element row.

Referring to FIGS. 1 and 2, there is shown an apparatus for manufacturing slide fastener spiral constructed in accordance with the invention. The apparatus comprises a forming screw assembly 10 consisting of a pair of first and second screws 11 and 12, a die assembly 20 consisting of a front die 21 and a rear die 22, an abutment assembly 30 consisting of a front abutment plate 31 and a rear abutment plate 32, and a rear forming assembly 40 consisting of a block member 41, a main spring 42, a shaft mechanism 43, a cap 45, a rear adjustment screw 46, and a pair of side adjustment screws 47. Each of above components will now be described in detail below.

Each of the first and the second screws 11 and 12 has an upper ridged post 13, an intermediate neck 14, and a lower thread section 15. The front die 21 is a rectangular plate and comprises two parallel half circular longitudinal grooves 23, a half-neck 231 sandwiched between the grooves 23, an elongate slot 25 in the half-neck 231, and a plurality of equally spaced apertures (six are shown) 27 at either longitudinal side. The rear die 22 is identical to the front die 21 and comprises two parallel half circular longitudinal grooves 24, a half-neck 241 sandwiched between the grooves 24, an elongate slot 26 in the half-neck 241, and a plurality of equally spaced apertures (six are shown) 28 at either longitudinal side. Hence, a combination of the grooves 23 and 24 can receive the first and the second screws 11 and 12 therein. Also, a combination of the half-necks 231 and 241 can receive a mandrel 17 therein. The front abutment plate 31 is a rectangular member and comprises an inner longitudinal trough 33 sized to receive the front die 21, a hole 35 through the trough 33, and a plurality of apertures (four are shown) 37 at either longitudinal side. The rear abutment plate 32 is also shaped as a rectangular member and comprises an inner longitudinal trough 34 sized to receive the rear die 22, an elongate slot 36 through the trough 34, a plurality of apertures 38, 381, and 383, and a plurality of screws 382. A plurality of screws are driven through the apertures 38 and 37 to fasten the front and the rear abutment plates 31 and 32 together. Likewise, the plurality of screws 382 are driven through the apertures 381, 28, and 27 to fasten the rear abutment plate 32 and the front and the rear dies 21 and 22 together.

The block member 41 comprises a central channel 410, a rectangular opening 411 in a front end of the channel 410 open to the outside, a hole 412 at either side, and a lug 413 having a hole at either side proximate the opening 411 so that the block member 41 can be fastened to the rear abutment plate 32 by driving screws 418-418 through the holes of the lugs 413 and the apertures 383 of the rear abutment plate 32. The shaft mechanism 43 comprises a front rectangular projection 432 inserted through the channel 410, the opening 411, the slot 36 of the rear abutment plate 32, and the slot 26 of the rear die 22 to be proximate the mandrel 17, an intermediate cylindrical section 431 received in the channel 410 with the main spring 42 put thereon, and a rear enlargement having two side flats 433. Cap 45 comprises a plurality of apertures (three are shown) 450 so that a plurality of screws may be driven through the apertures 450 and corresponding apertures of the block member 41 to secure the cap 45 to the block member 41. Also the rear adjustment screw 46 is driven through the aperture 450 to engage with a rear end the shaft mechanism 43. With this construction, a stable apparatus for manufacturing slide fastener spiral continuous element row having a feature of very little vibration can be obtained as detailed later. Note that there are further provided two elastic members (e.g., coil springs) 471 in holes 412 each biased between the side adjustment screw 47 and the flat 433 of the rear enlargement of the shaft mechanism 43.

Referring to FIGS. 3 to 7, an operation and characteristics of the invention will now be described in detail below. The apparatus is mounted on a stand 50 of a zipper machine. A zipper forming space is defined by the front and the rear abutment plates 31 and 32, the pair of screws 11 and 12, the mandrel 17, and the front rectangular projection 432 of the shaft mechanism 43. A monofilament 61 is guided from a source (not shown) into the zipper forming space. The mandrel 17 has a longitudinal recess for permitting a core thread 60 to pass through. A head 71 of a spring-biased rod 70 passes through the hole 35 of the front abutment plate 31 to be located in the slot 25 of the front die 21. As such, a reciprocating motion of the spring-biased rod 70 may cause the head 71 thereof to hit the element 62 to continuously form a front coupling head of coil-shaped element 62 in manufacturing process. As a result, a coupling head 63 is formed in a front end of the element 62 and a joint portion 64 is formed in a rear end of the element 62 by urging against the front rectangular projection 432.

For obtaining a stable operation of the invention an adjustment of the shaft mechanism 43 is required. For example, a user can manipulate the rear adjustment screw 46 to either push the shaft mechanism 43 forward as the main spring 42 compressed or pull the shaft mechanism 43 rearward as the main spring 42 expanded in any time. And in turn, a distance of the front rectangular projection 432 projected into the zipper forming space can be controlled. Thus, an axial adjustment of the shaft mechanism 43 is effected. In response, a fine adjustment of the zipper forming space is made possible. As an end, a precision of the element 62 is increased. Hence, the mandrel 17 can be corrected by above adjustment if a precision thereof is adversely affected due to wear. Alternatively, the mandrel 17 can be corrected by above adjustment if a precision thereof is adversely affected because the size thereof exceeds an allowance due to machining error. Moreover, it is possible of performing a lateral adjustment of the apparatus by manipulating the side adjustment screws 47 to push the flats 433 of the rear enlargement of the shaft mechanism 43. As an end, the precision of the produced elements can be further increased. In brief, with the securing of the rear forming assembly 40 the vibration of the zipper machine is substantially eliminated. Most importantly, it is possible of performing a fine adjustment about the zipper forming space at the rear of the abutment assembly 30 in a simple and reliable manner. Hence, high quality zippers are manufactured.

While the invention herein disclosed has been described by means of specific embodiments, numerous modifications and variations could be made thereto by those skilled in the art without departing from the scope and spirit of the invention set forth in the claims.

What is claimed is:

1. An apparatus for continuously manufacturing a slide fastener spiral element row from a continuous monofilament, comprising:

a forming screw assembly including a first and a second screws;

a die assembly including a rectangular front die and a rectangular rear die;

an abutment assembly including a rectangular front abutment plate and a rectangular rear abutment plate; and a rear forming assembly including of a hollow block member secured to the rear abutment plate, a shaft mechanism received in the block member, a rear cap secured to the block member, and a rear adjustment screw driven through the rear cap to engage with a rear end of the shaft mechanism;

wherein in an axial adjustment of the shaft mechanism, a manipulation of the rear adjustment screw enables the shaft mechanism to either push forward as the main spring compressed or pull rearward as the main spring expanded, in response, a distance of the shaft mechanism into a zipper forming space defined by the abutment plates and the screws is made optimal.

2. The apparatus of claim 1, wherein the block member comprises a hole in either side and two side adjustment screws having shanks received in both holes.

3. The apparatus of claim 2, further comprising two coil springs each biased between the side adjustment screw and the shaft mechanism for effecting a lateral adjustment of the shaft mechanism.

4. The apparatus of claim 2, wherein the shaft mechanism further comprises a front rectangular projected, a main spring put on the front rectangular projection, and a rear enlargement having two side flats.

5. The apparatus of claim 2, wherein the block member further comprises a lug having a hole at either side so that the block member is capable of threadedly securing to the rear abutment plate.

6. An apparatus for continuously manufacturing a slide fastener spiral element row from a continuous monofilament, comprising:

a forming screw assembly including a first and a second screws;

a die assembly including a rectangular front die and a rectangular rear die, both dies being threadedly secured together;

an abutment assembly including a rectangular front abutment plate and a rectangular rear abutment plate, both plates being threadedly secured together; and a rear forming assembly including a block member, a main spring, a shaft mechanism, a rear cap, a rear adjustment screw, and a pair of side adjustment screws;

wherein the front die and the rear die includes two parallel half circular longitudinal grooves, a top half-neck between the grooves, and an elongate slot in the half-neck so that a combination of the grooves is capable of receiving the forming screws and a combination of the half-necks is capable of receiving a mandrel; the front abutment plate includes an inner longitudinal first trough sized to receive the front die, and an elongate first slot through the first trough; the rear abutment plate includes an inner longitudinal second trough sized to receive the rear die, and an elongate second slot through the second trough; the block member includes a central channel and a front rectangular opening in communication with the channel; the shaft mechanism includes a front rectangular projection inserted through the channel, the opening, the slot of the rear abutment plate, and the slot of the rear die to be proximate the mandrel and an intermediate cylindrical section received in the channel with the main spring put thereon; and the rear cap is threadedly secured to the block member and includes an aperture with the rear adjustment screw driven through to engage with a rear end the shaft mechanism.

7. The apparatus of claim 6, wherein the block member further comprises a hole in either side thereof and two side adjustment screws having shanks received in both holes, respectively.

8. The apparatus of claim 7, further comprising two coil springs each biased between the side adjustment screw and the shaft mechanism for effecting a lateral adjustment of the shaft mechanism.

9. The apparatus of claim 7, wherein the shaft mechanism further comprises a rear enlargement having two side flats.

10. The apparatus of claim 6, wherein the block member further comprises a lug having a hole at either side so that the block member is capable of threadedly securing to the rear abutment plate.

* * * * *